United States Patent
Keiser et al.

(10) Patent No.: US 9,965,746 B1
(45) Date of Patent: May 8, 2018

(54) PROCESSOR-BASED SELF-SERVICE TERMINALS USED WITH RESPECT TO CONTROLLED ENVIRONMENT FACILITIES

(75) Inventors: Luke Keiser, Frisco, TX (US); Bruce Cooper, Dallas, TX (US); John J. Viola, Keller, TX (US); Randy Hoffman, Plano, TX (US)

(73) Assignee: Securus Technologies, Inc., Carrollton, TX (US)

( * ) Notice: Subject to any disclaimer, the term of this patent is extended or adjusted under 35 U.S.C. 154(b) by 2745 days.

(21) Appl. No.: 11/125,842

(22) Filed: May 10, 2005

Related U.S. Application Data

(63) Continuation-in-part of application No. 10/135,878, filed on Apr. 29, 2002, now abandoned.

(51) Int. Cl.
*G06Q 10/10* (2012.01)

(52) U.S. Cl.
CPC .................................. *G06Q 10/105* (2013.01)

(58) Field of Classification Search
CPC ..................................................... G06Q 10/105
USPC .............................................. 705/1, 1.1–912
See application file for complete search history.

(56) References Cited

U.S. PATENT DOCUMENTS

| | | |
|---|---|---|
| 5,185,781 A | 2/1993 | Dowden et al. |
| 5,210,789 A | 5/1993 | Jeffus et al. |
| 5,345,501 A | 9/1994 | Shelton |
| 5,485,507 A | 1/1996 | Brown et al. |
| 5,517,555 A | 5/1996 | Amadon et al. |
| 5,627,887 A | 5/1997 | Freedman |
| 5,655,013 A | 8/1997 | Gainsboro |
| 5,832,068 A | 11/1998 | Smith |
| 5,861,810 A | 1/1999 | Nguyen |
| 5,915,001 A | 6/1999 | Uppaluru |
| 5,926,533 A | 7/1999 | Gainsboro |
| 5,937,035 A | 8/1999 | Andruska et al. |
| 5,991,373 A | 11/1999 | Pattison et al. |
| 6,038,315 A | 3/2000 | Strait et al. |
| 6,058,163 A | 5/2000 | Pattison et al. |

(Continued)

OTHER PUBLICATIONS

Dye, Charles, "Oracle Distributed Systems," O'Reilly Media, Inc., Apr. 1, 1999.
McCollum, "Federal Prisoner Health Care Copayment Act of 2000," House of Representatives Report 106-851, 106th Congress 2d Session, Sep. 14, 2000.
Fischer, Alan D., "COPLINK nabs criminals faster," Arizona Daily Star, Jan. 7, 2001.

(Continued)

*Primary Examiner* — Joanthan P Ouellette
(74) *Attorney, Agent, or Firm* — Fogarty LLP

(57) ABSTRACT

Systems and methods are shown which provide processor-based self-service systems for use with respect to controlled environment facilities. Embodiments provide processor-based self-service systems having robust input/output capabilities in order to support a wide range of functionality. Processor-based self-service systems of embodiments are adapted to be deployed within a controlled environment facility, such as within a lobby area, a holding area, and/or a restricted area of a controlled environment facility. According to embodiments, processor-based self-service systems are used with respect to a plurality of functions and a plurality of users, thereby processing a variety of information associated with a controlled environment facility. Embodiments operate to aggregate, compile, correlate, and link information to provide data heretofore unavailable from separate or manual systems used with respect to controlled environment facilities.

30 Claims, 7 Drawing Sheets

(56) References Cited

U.S. PATENT DOCUMENTS

| | | | |
|---|---|---|---|
| 6,072,860 | A | 6/2000 | Kek |
| 6,118,860 | A * | 9/2000 | Hillson et al. ............... 379/155 |
| 6,173,284 | B1 | 1/2001 | Brown |
| 6,175,831 | B1 | 1/2001 | Weinreich et al. |
| 6,308,171 | B1 | 10/2001 | De La Huerga |
| 6,636,591 | B1 | 10/2003 | Swope et al. |
| 6,639,977 | B1 | 10/2003 | Swope et al. |
| 6,639,978 | B2 | 10/2003 | Draizin et al. |
| 6,665,376 | B1 | 12/2003 | Brown |
| 6,668,045 | B1 | 12/2003 | Mow |
| 6,688,518 | B1 * | 2/2004 | Valencia et al. ............. 235/379 |
| 6,768,792 | B2 | 7/2004 | Brown et al. |
| 6,782,370 | B1 | 8/2004 | Stack |
| 6,920,209 | B1 | 7/2005 | Gainsboro |
| 6,947,525 | B2 | 9/2005 | Benco |
| 7,039,171 | B2 | 5/2006 | Gickler |
| 7,075,919 | B1 | 7/2006 | Wendt et al. |
| 7,079,636 | B1 | 7/2006 | McNitt et al. |
| 7,079,637 | B1 | 7/2006 | McNitt et al. |
| 7,106,843 | B1 | 9/2006 | Gainsboro et al. |
| 7,124,438 | B2 | 10/2006 | Judge et al. |
| 7,133,845 | B1 | 11/2006 | Ginter et al. |
| 7,466,816 | B2 | 12/2008 | Blair |
| 7,529,357 | B1 | 5/2009 | Rae et al. |
| 7,698,182 | B2 | 4/2010 | Falcone et al. |
| 2001/0036821 | A1 | 11/2001 | Gainsboro et al. |
| 2001/0043697 | A1 | 11/2001 | Cox et al. |
| 2002/0046057 | A1 * | 4/2002 | Ross ................................. 705/1 |
| 2002/0067272 | A1 | 6/2002 | Lemelson et al. |
| 2002/0069084 | A1 | 6/2002 | Donovan |
| 2002/0107871 | A1 | 8/2002 | Wyzga et al. |
| 2002/0147707 | A1 | 10/2002 | Kraay et al. |
| 2003/0002639 | A1 | 1/2003 | Hie |
| 2003/0023874 | A1 | 1/2003 | Prokupets et al. |
| 2003/0070076 | A1 | 4/2003 | Michael |
| 2003/0093533 | A1 | 5/2003 | Ezerzer et al. |
| 2003/0099337 | A1 | 5/2003 | Lord |
| 2003/0126470 | A1 | 7/2003 | Crites et al. |
| 2003/0174826 | A1 | 9/2003 | Hesse |
| 2003/0190045 | A1 | 10/2003 | Huberman et al. |
| 2004/0161086 | A1 | 8/2004 | Buntin et al. |
| 2005/0027723 | A1 | 2/2005 | Jones et al. |
| 2005/0170818 | A1 | 8/2005 | Netanel et al. |
| 2007/0041545 | A1 | 2/2007 | Gainsboro |

OTHER PUBLICATIONS

Wilkinson, Reginald A., "Visting in Prison," Prison and Jail Administration's Practices and Theory, 1999.

Chau, Michael, "Building an Infrastructure for Law Enforcement Information Sharing and Collaboration: Design Issues and Challenges," National Conference on Digital Government, Short Paper, 2001.

Hauck, Roslin V., "Coplink: A Case of Intelligent Analysis and Knowledge Management," Proceedings of the International Conference on Information Systems, pp. 15-28, Dec. 1999.

I2 Investigative Analysis Software, "i2 Text Chart—Text Visualized," URL: http://www.i2.co.uk/Products/i2TextChart/, Jun. 13, 2005.

I2 Investigative Analysis Software, "i2 iBase—Information Captured," URL: http://www.i2.co.uk/Products/iBase/, Jun. 13, 2005.

I2 Investigative Analysis Software, "iBridge," URL: http://www.i2.co.uk/Products/iBridge/, Jun. 13, 2005.

I2 Investigative Analysis Software, "Chart Reader," URL: http://www.i2.co.uk/Products/Chart_Reader/, Jun. 13, 2005.

I2 Investigative Analysis Software, "Pattern Tracer," URL: http://www.i2.co.uk/Products/Pattern_Tracer/, Jun. 13, 2005.

I2 Investigative Analysis Software, "Prisons," URL: http://www.i2.co.uk/Products/Prisons/default.asp, Jun. 13, 2005.

I2 Investigative Analysis Software, "Setting International Standards for Investigative Analysis," URL: http://www.i2.co.uk/Products/index.htm, Jun. 13, 2005.

Microsoft, "Integrated Justice Information Systems (IJIS): An Overview," retrieved from Microsoft Justice & Public Safety Solutions website, URL: http://jps.directlaps.net/_vti_bin/owssvrdll?Using=Default%2ehtm, Nov. 5, 2002.

Imagis Technologies Inc., "CABS—Computerized Arrest and Booking System," URL: http://www.imagistechnologies.com/Product/CABS.htm, Nov. 5, 2002.

Imagis Technologies Inc., "Integrated Justice System—Web based Image and Data Sharing," URL: http://www.imagistechnologies.com/Product/IJISFramework.htm, Nov. 5, 2002.

O'Harrow, Robert, Jr., U.S. Backs Florida's New Counterterrorism Database: 'Matrix' Offers Law Agencies Faster Access to Americans Personal Records, The Washington Post, Aug. 6, 2003, p. A.01.

O'Harrow, Robert, Jr., "Database will make tracking suspected terrorists easier," The Dallas Morning News, Aug. 6, 2003, p. 7A.

* cited by examiner

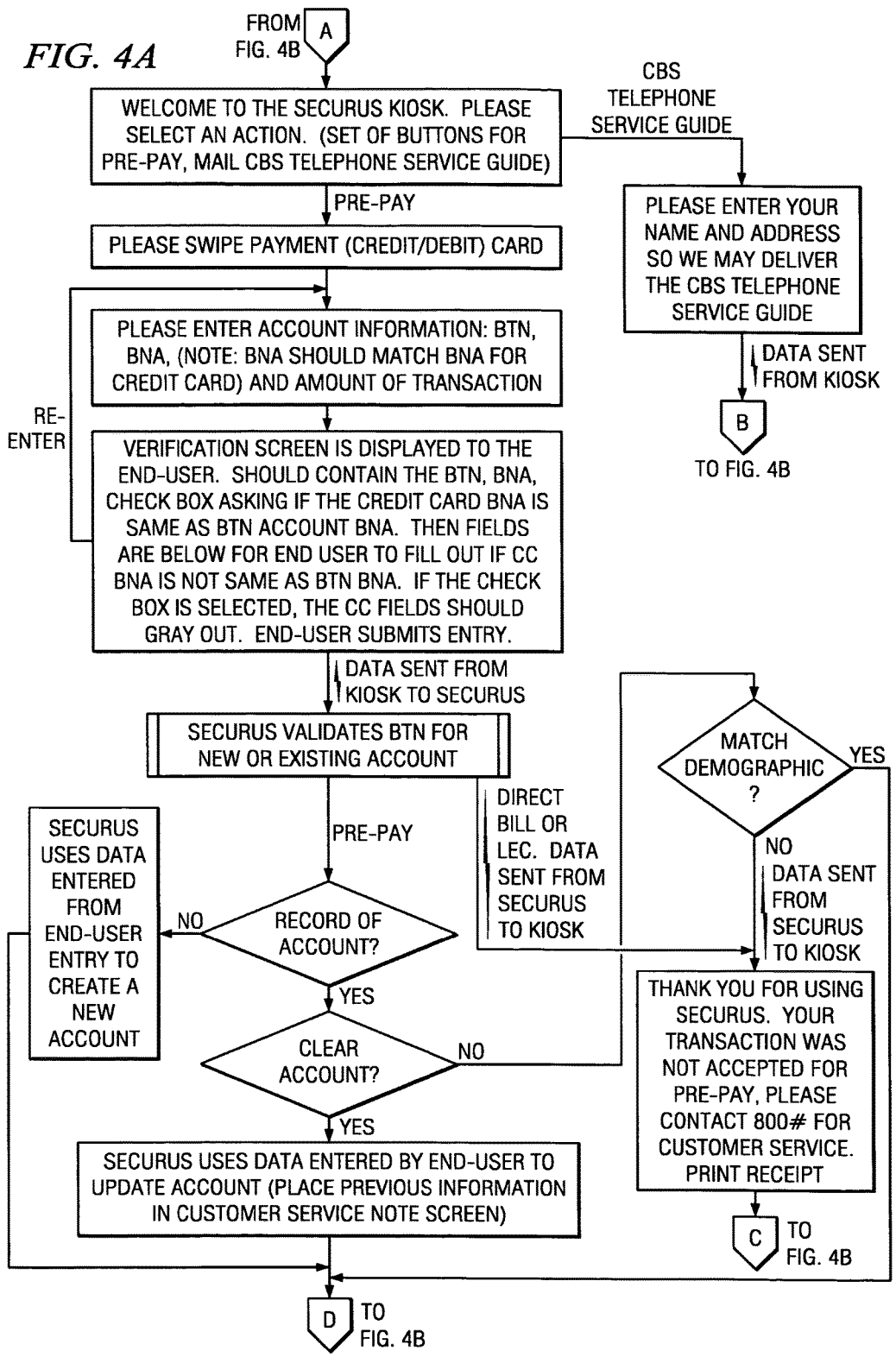

PROCESSOR-BASED SELF-SERVICE TERMINALS USED WITH RESPECT TO CONTROLLED ENVIRONMENT FACILITIES

CROSS-REFERENCE TO RELATED APPLICATIONS

The present application is a continuation-in-part of co-pending and commonly assigned U.S. patent application Ser. No. 10/135,878 entitled "Information Management and Movement System and Method," filed Apr. 29, 2002, the disclosure of which is hereby incorporated herein by reference. The present application is related to co-pending and commonly assigned U.S. patent application Ser. No. 10/720,732 entitled "Information Management and Movement System and Method," filed Nov. 24, 2003, Ser. No. 10/602,233 entitled "System and Method for Transaction and Information Management," filed Jun. 24, 2003, and Ser. No. 10/642,532 entitled "Centralized Call Processing," filed Aug. 15, 2003, the disclosures of which are hereby incorporated herein by reference.

TECHNICAL FIELD

The present invention relates generally to information systems, and more particularly, to information systems used with respect to a controlled environment.

BACKGROUND OF THE INVENTION

In a controlled environment, such as within a prison or jail facility, controlling access, information, interaction, and/or transactions is often of particular interest. In a prison facility in particular, safety and security is of paramount importance and, therefore, the number one job of the personnel thereof is to effectively implement controls with respect to the residents (inmates) thereof. However, such controlled environments often provide an environment much like a small city in which a number of individuals work and live, thus requiring various goods and/or services associated with civilized society. Accordingly, various exchanges of information, money, goods, etcetera may be performed in association with individuals of a controlled environment, both within the controlled environment and external thereto.

For example, an inmate residing in a prison facility may wish to communicate with friends and family outside of the prison facility. Likewise, an inmate may wish to acquire commissary items, such as toiletries, bed linens, clothing, and food items. An inmate may also require medical services, such as consultation with a nurse or physician and dispensing of prescription medications.

However, facilitating and administrating exchanges of information, money, goods, etcetera with respect to a controlled environment facility, such in association with each of the foregoing examples, is often costly and time consuming and may even present security and safety issues. For example, often substantial controlled environment facility personnel (e.g., guard) time is expended in scheduling visitations, conducting background checks with respect to visitors, providing information regarding visitation times and rules, etcetera. Likewise, substantial controlled environment facility personnel time is expended in taking orders for commissary items, verifying that individuals have sufficient funds to purchase commissary items, accepting and accounting for funds received from various individuals for the benefit of another individual to purchase commissary, reporting status of accounts and orders, delivering commissary orders, etcetera. Substantial controlled environment facility personnel time is expended in scheduling infirmary visits, distributing medications, confirming that appropriate medications have been distributed and consumed in accordance with prescriptions, etcetera. Moreover, such personnel may be called upon repeatedly to perform such tasks as respond to balance inquiries, explain account deductions/credits, answering frequently asked questions, and/or the like. The time such controlled environment facility personnel dedicate to such tasks is both costly to the controlled environment facility and removes such personnel from other tasks, such as securing the facility and monitoring the activity of the population.

Moreover, such tasks as accomplished today are typically largely paper based and require appreciable manual processing, thereby further aggravating the directing of personnel's attention away from tasks more primary to the operation of the controlled environment facility and further adding to the costs. For example, appreciable resources are often involved in taking commissary orders, such as to provide updated item and price lists, order forms (e.g., SCANTRON forms), etcetera. Accordingly, current processes for facilitating and administering exchanges of information, money, goods, etcetera with respect to a controlled environment facility involve substantial expenses for consumable resources.

The level of service provided to individuals attempting to exchange information, money, goods, etcetera with respect to a controlled environment facility is often unsatisfactory. For example, friends or family of an inmate may wish to visit the inmate, but not have information with respect to visitation rules, visitation times, and the inmate's schedule. Accordingly, a friend or family member may travel to a prison in which the inmate is incarcerated only to find that the friend or family member is not attired according to the prison visitation dress code, that visitation is not offered that day/time, that the inmate is indisposed at a infirmary appointment, and/or the like. Accordingly, the friend or family member may be unable to visit the inmate. The friend or family member may obtain information from prison personnel regarding the dress code and visitation hours in an effort to return when visitation is possible. However, even the second visitation attempt may result in failure, such as due to the inmate being indisposed or the prison being in an unexpected "lock-down" state (e.g., due to inmate disobedience). Friends or family members may have difficulty and/or be required to wait appreciable amounts of time to obtain information, such as the condition of an inmate, whether an inmate has been given their prescription medication, an account balance for an inmate, etcetera, because they must identify the appropriate prison personnel to query and await information from their query. In many situations, the friends and family are unable to obtain many such information services.

Dissatisfaction with the level of services provided may also be present with respect to the population residing within the controlled environment facility. For example, inmates in a prison may be required to wait substantial periods of time to obtain information, such as time remaining in their sentence, the number of days of good behavior they have achieved, an account balance, etcetera, because prison personnel must be queried, the prison personnel must obtain the information from an appropriate source, and return the information to the inmate. Inmates may not even be provided some services which would be beneficial. For example, inmates are often unable to take steps toward obtaining employment after their release while they are still incarcerated.

Controlled environment facility personnel may also find level of services provided unsatisfactory. For example, as mentioned above, such personnel may repeatedly be asked to provide information to inmates as well as friends and family of inmates. The requested information may be of general interest, and thus provided repeatedly, or of special interest, often requiring the personnel to identify the appropriate source of information, obtain the information, and provide the retrieved information to the appropriate person. Such personnel may additionally or alternatively be assigned tasks, such as conducting background checks on visitors, for which insufficient information is provided (e.g., the visitor failing to provide a driver's license number or social security number) and/or for which only manual or inadequate systems are available to perform the task.

Until recently it was generally believed that telephones could not safely be placed within particular controlled environment facilities, such as prison facilities, for use by residents thereof. However, telephone terminals and call control systems have been developed which have allowed telephones to be placed within controlled environment facilities, such as within prison pods, for use by the residents thereof. For example, telephone terminals which are adapted to withstand the abuse of prisoners and call control systems allowing calls to be placed only to authorized number lists have been developed to meet safety and security requirements.

Using telephone terminals placed within the controlled environment facilities has enabled residents to establish communications with friends and family without the assistance of controlled environment facility personnel. Moreover, the use of such telephone systems has resulted in appreciable revenues to the controlled environment facilities. However, implementation of the foregoing telephone systems has not fully addressed the issues associated with facilitating and administrating communications between residents and their friends and family. For example, calls placed through the telephone systems must typically be paid for. Accordingly, controlled environment facility personnel continue to be required to establish pre-paid accounts, accept funds from individuals, update account balances, provide information regarding account balances and status, and account for funds.

BRIEF SUMMARY OF THE INVENTION

The present invention is directed to systems and methods which provide processor-based self-service systems for use with respect to controlled environment facilities. Processor-based self-service systems of embodiments of the present invention comprise a self-contained kiosk configuration, although other configurations may be utilized. Controlled environment facilities with which processor-based self-service systems of the present invention may be used include inmate facilities (e.g., municipal jails, county jails, state prisons, federal prisons, military stockades, juvenile facilities, and detention camps), hospitals, nursing homes, camps, and the like.

Embodiments of the present invention provide processor-based self-service systems having robust input/output capabilities in order to support a wide range of functionality. For example, processor-based self-service systems of embodiments present a user friendly graphical user interface, provide intuitive application navigation, efficiently present large amounts of data, support multi-media content (e.g., text, graphics, speech, sound, and/or images), accept multi-media input (e.g., pointer, keyboard, stylus, barcode, scanner, voice, touch screen, magnetic strip, and/or magnetic ink character recognition (MICR)), and/or implement biometrics (e.g., fingerprint, voice print, DNA, iris identification, and/or retina scanning). Such processor-based self-service systems may be utilized to provide a variety of users convenient access to input information, conduct queries, and obtain information and services.

Processor-based self-service systems of embodiments of the present invention are adapted to be deployed within a controlled environment facility, such as within a lobby area, a holding area, and/or a restricted area of a controlled environment facility. Processor-based self-service systems of embodiments of the invention may additionally or alternatively be adapted to be disposed external to a controlled environment facility. For example, processor-based self-service systems may be deployed at locations affiliated with a particular controlled environment facility, locations convenient to individuals wishing to exchange information, money, goods, etcetera with respect to a controlled environment facility, and/or the like.

Processor-based self-service systems of the invention may be provided in different configurations and/or provide different functionality, such as depending upon an area into which it is deployed. For example, a processor-based self-service system deployed in a restricted area may be hardened against substantial abuse and/or deployed in a distributed configuration (e.g., input/output provided within the restricted area and processor provided external to the restricted area), and may provide information retrieval, communication services, and/or other functionality appropriate to the restricted area. Likewise, processor-based self-service systems disposed in a holding area or lobby area may provide information retrieval, communication services, funds deposit, and/or other functionality appropriate to the respective area. A processor-based self-service system disposed in a holding area according to embodiments may be less hardened than a counterpart processor-based self-service system disposed in a restricted area, although the processor-based self service system is to be used by residents of the controlled environment facility, because of a higher level of user supervision in the holding area. Similarly, a processor-based self-service system disposed in a lobby area according to embodiments may be less hardened than a counterpart processor-based self-service system disposed in a restricted area or a holding area because of a higher level of user supervision and/or a decreased likelihood that residents of the controlled environment facility will have access to such systems.

Processor-based self-service systems of the present invention may be coupled to other systems, whether internal or external to a controlled environment facility. For example, processor-based self-service systems of embodiments are coupled to networks (such as the public switched telephone network (PSTN) and the Internet), databases (such as demographic databases, consumer account databases, historical records databases, government databases, and judicial databases), facilities (such as banking facilities, funds clearing houses, and verification/validation facilities, medical facilities, government facilities), and platforms (such as personal computers, servers, computer networks, information management systems, and/or other processor-based self-service systems of the present invention).

According to embodiments of the invention, processor-based self-service systems are used with respect to a plurality of functions and a plurality of users, thereby processing a variety of information associated with a controlled environment facility. Accordingly, embodiments operate to aggregate, compile, correlate, and link information to provide data heretofore unavailable from separate or manual systems used with respect to controlled environment facilities. Processor-based self-service systems of embodiments of the invention reduce costs, improve revenues, improve efficiency, and/or improve safety with respect to a controlled environment facility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 4A and 4B show detail with respect to a screen paging flow as may be presented by a processor-based user terminal operating according to the flow diagram of FIG. 3.

DETAILED DESCRIPTION OF THE INVENTION

Figure 1A:
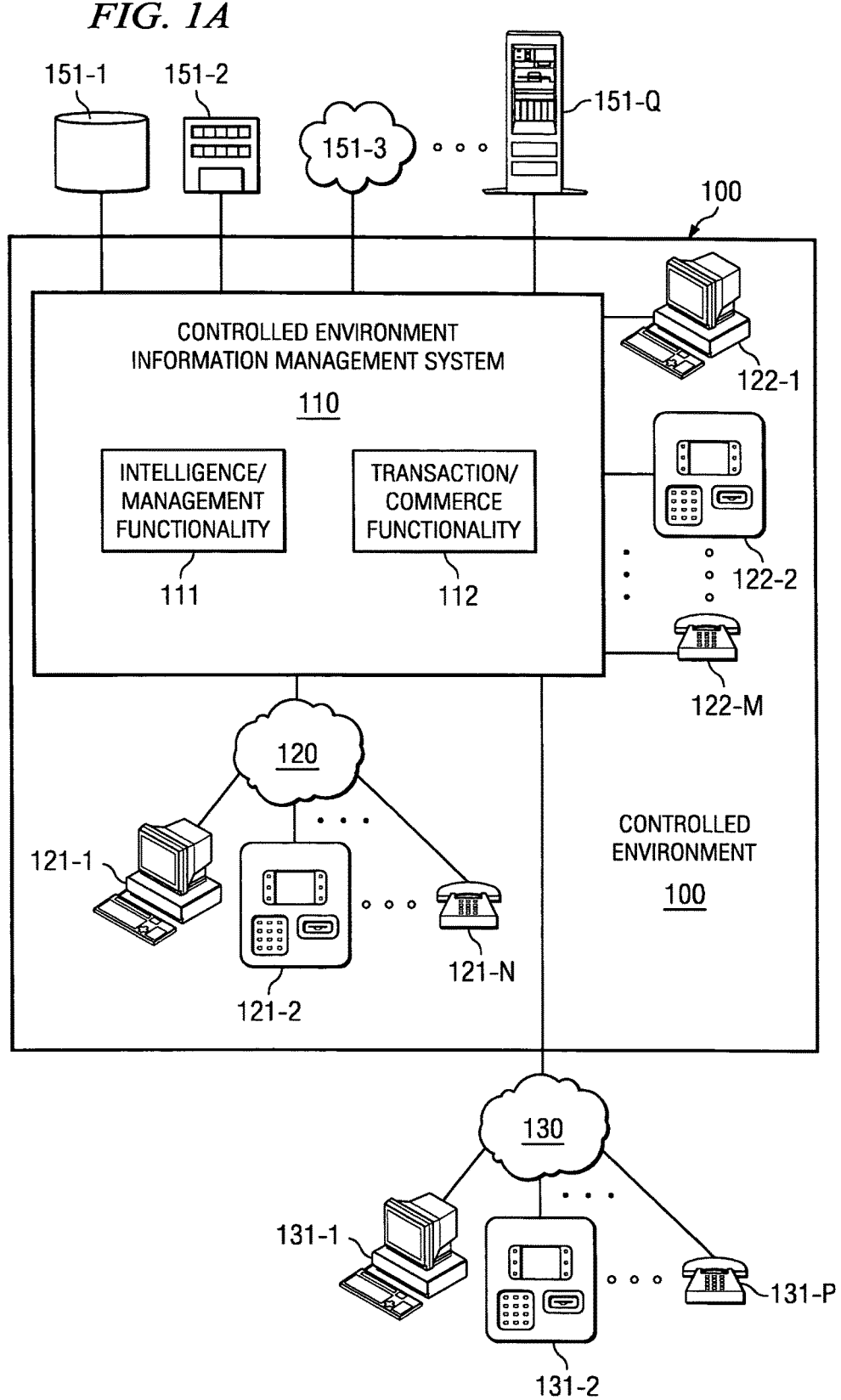
FIGS. 1A and 1B show controlled environment information management systems adapted according to embodiments of the present invention.

Directing attention to FIG. 1A, a controlled environment information management system adapted according to an embodiment of the present invention to provide management and movement of information as well as transaction and commerce facilitation in association with a controlled environment facility is shown. Operation of information management system 110 preferably facilitates and administers exchanges of information, money, goods, etcetera with respect to controlled environment facility 100 through use of user terminals 121-1 through 121-N, 122-1 through 122-M, and 131-1 through 131-P, and/or resources 151-1 through 151-Q.

Figure 1B:
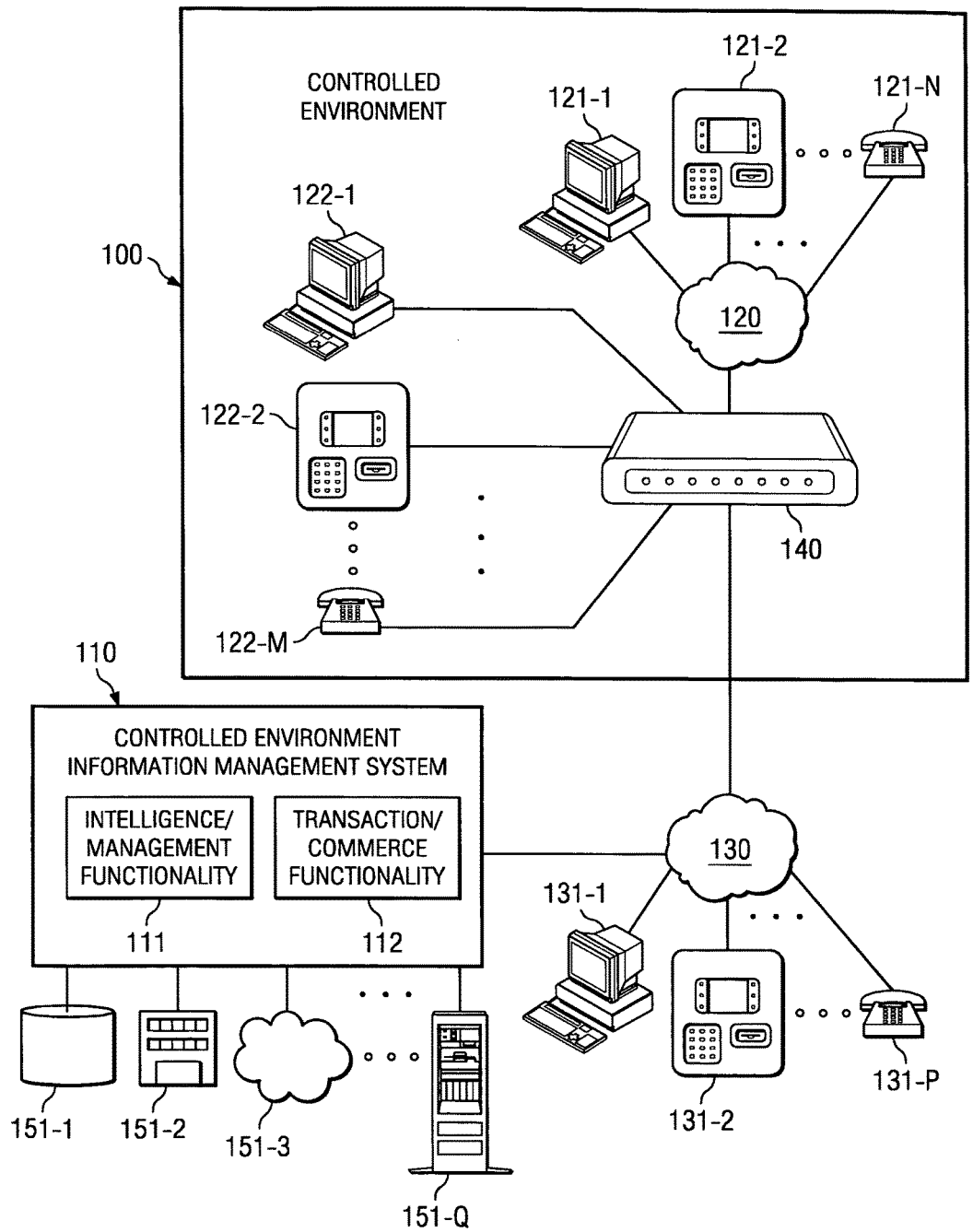

Controlled environment information management system 110 of the embodiment shown in FIG. 1A is deployed within controlled environment facility 100. Although illustrated as being deployed within the controlled environment facility in FIG. 1A, it should be appreciated that controlled environment information management systems of the present invention may be deployed in a number of configurations. For example, the embodiment of FIG. 1B provides centralized architecture in which information management system 110 is deployed external to controlled environment facility 100, with user terminals and/or other access points (shown as user terminals 121-1 through 121-N and 122-1 through 122-M) deployed within the controlled environment facility. Additionally or alternatively, information management systems may be provided in a distributed topology, such as having server systems, application programs, and/or databases distributed throughout a number of geographic locals, according to embodiments of the present invention.

It should be appreciated that, although only a single controlled environment facility is represented in FIGS. 1A and 1B, any number of controlled environment facilities may be served by information management systems adapted according to embodiments of the invention. Likewise, although a single information management system is illustrated, various numbers of information management systems, perhaps having varied configurations and/or disposed at different geographic locations, may be implemented to serve one or more controlled environment facilities.

In accordance with embodiments of the present invention, controlled environment information management system 110 is adapted to include intelligence/management functionality 111 and transaction/commerce functionality 112 operable to facilitate and administer exchanges of information, money, goods, etcetera with respect to controlled environment facility 100. Preferably, intelligence/management functionality 111 provides for collection, storage, and movement of information for managing various operational aspects of the controlled environment facility, including the management of personnel, residents, vendors, and resources. Transaction/commerce functionality 112 preferably provides for the instigation and completion of various transactions, including requesting and providing goods and services, determining credit worthiness, verifying account balance and status, and providing for payment. The aforementioned functionality is preferably provided according to the present invention at any distance and at any time. Further detail with respect to operation of embodiments of an information management system, and the intelligence/management and transaction/commerce functionalities thereof, is provided in the above referenced patent applications entitled "Information Management and Movement System and Method," "System and Method for Transaction and Information Management," and "Centralized Call Processing."

Information management system 110 of the illustrated embodiment provides connectivity to user terminals 122-1 through 122-M disposed within controlled environment facility 100 via direct connections, user terminals 121-1 through 121-N disposed within controlled environment facility 100 via indirect connections (here comprising network or networks, referred to herein as network 120), user terminals 131-1 through 131-P disposed external to controlled environment facility 100 via indirect connections (here comprising XML connections and/or network or networks, referred to herein as network 130), and resources 151-1 through 151-Q. Accordingly, user terminals of the present invention may be coupled to other systems, whether internal or external to controlled environment facility 100. For example, user terminals of embodiments are coupled to networks (such as the public switched telephone network (PSTN) and the Internet, illustrated as network 151-3), databases (such as demographic databases, consumer account databases, historical records databases, government databases, and judicial databases, illustrated as database 151-1), facilities (such as banking facilities, funds clearing houses, and verification/validation facilities, illustrated as facilities 151-2) and platforms (such as personal computers, servers, computer networks, and information management systems, illustrated as server 151-Q).

The centralized configuration of FIG. 1B implements one or more gateways, shown here as gateway 140, at or near sites for which services are to be provided, here controlled environment facility 100. Gateway 140 may provide interfacing and arbitration between a number of protocols, signals, and/or interfaces. For example, preferred embodiment gateway 140 provide a plurality of analog telephone line interfaces (e.g., POTS line interfaces) for coupling to a plurality of telephone terminals 121-N and/or 122-M and providing loop current, dial tone, etcetera thereto. Preferred embodiment gateway 140 further provides at least one WAN interface (e.g., T1 interface) for coupling to a data, e.g., packet switched, network. Gateway 140 of this preferred embodiment provides conversion of analog signals associated with telephone terminals and digital data packets of the packet switched network to provide a VoIP gateway. Gateway 140 preferably includes additional or alternative interfaces, such as LAN interfaces (e.g., 100 Mbit Ethernet interface), wireless interfaces (e.g., 802.11 interface), etcetera. Embodiments of the present invention utilize commercially available devices, such as the IAD 2400 series of integrated access devices available from Cisco Systems, Inc., San Jose, Calif., in providing a gateway.

Users, whether they be residents of the controlled environment facility, friends and family, controlled environment facility personnel, etcetera, and whether they are disposed within the controlled environment facility or external thereto, are preferably provided a plurality of user terminals for facilitating and administrating exchanges of information, money, goods, etcetera with respect to controlled environment facility 100. As shown in FIGS. 1A and 1B, information management system 110 may provide a number of access points coupled to a variety of user terminal equipment configurations. User terminal equipment utilized according to embodiments of the invention may include personal computers, kiosks, personal digital assistants (PDAs), pagers, telephones (wireline and wireless), facsimile machines, and the like, coupled through direct links, such as wireline, cable, fiber optic, etcetera, and/or indirect links, such as network links, private branch exchange (PBX) links, etcetera.

According to embodiments of the invention, user terminals, such as computers 121-1, 122-1, 131-1 and kiosks 121-2, 122-2, and 131-2, comprise processor-based systems which are adapted for use with respect to a plurality of functions and a plurality of users, thereby processing a variety of information associated with controlled environment facility 100. Preferably, such processor-based systems are adapted to provide robust input/output capabilities in order to support a wide range of functionality and to facilitate self-service operation with respect to information management system 110. For example, user terminals 121-1, 121-2, 122-1, 122-2, 131-1, and 131-2 may be configured as processor-based self-service systems having a user friendly graphical user interface with intuitive application navigation, efficiently presenting large amounts of data, supporting multi-media content (e.g., text, graphics, speech, sound, and/or images), accepting multi-media input (e.g., pointer, keyboard, barcode, scanner, voice, touch screen, magnetic strip, and/or MICR), and/or implementing biometrics (e.g., fingerprint, voice print, DNA, iris identification, and/or retina scanning). Such processor-based self-service systems are preferably utilized to provide a variety of users convenient access to input information, conduct queries, and obtain information and services, thereby reducing costs, improving revenues, improving efficiency, and/or improving safety with respect to controlled environment facility 100.

A most preferred embodiment processor-based self-service user terminal configuration comprises a self-contained kiosk configuration, such as illustrated by the kiosk configuration of user terminals 121-2, 122-2, and 131-2. Such kiosk configurations are preferably adapted to be deployed within controlled environment facility 100, such as within a lobby area, a booking or holding area, and/or a restricted (e.g., pod or cell) area of controlled environment facility 100. Kiosk configurations of embodiments of the invention may additionally or alternatively be adapted to be disposed external to controlled environment facility. For example, user terminals may be deployed at locations affiliated with a particular controlled environment facility (e.g., a courthouse, a police department, a government building, etcetera), locations convenient to individuals wishing to exchange information, money, goods, etcetera with respect to a controlled environment facility, and/or the like (e.g., a convenience store, a bail bondsman's office, a lawyer's office, a doctor's office, a post office, etcetera).

User terminals, such as the aforementioned kiosks, may be provided in different configurations and/or provide different functionality, such as depending upon an area into which it is deployed and/or the users expected to utilize the terminals. For example, although most or all kiosk user terminals may be hardened against user abuse to some extent, kiosk user terminals disposed in high abuse areas, such as within a cell or pod area of a prison, may incorporate a highest level of hardening techniques. Kiosk user terminals disposed in areas where supervision is present, such as within a booking or holding area, a public lobby area, or within a business, may incorporate lower levels of hardening techniques. However, various levels of hardening techniques may be implemented with respect to user terminals disposed within any or all the foregoing areas.

A kiosk user terminal deployed in a restricted area, such as within a cell or pod area of a prison, may be hardened against substantial potential for abuse. Such hardening may comprise providing a shock and tamper resistant housing having no or few external or moving parts, providing secure attachment points for affixing to a wall or other permanent structure, disposing all wiring internal to the terminal and having all external wiring enter via points protected by the terminal's attachment to the wall or other permanent structure, providing user input through a touch screen having a thick or otherwise shock resistant touch mask, disposing speakers and/or microphones behind perforated surfaces of the housing, and/or the like. In another configuration, hardening may comprise providing a hardened housing for input/output (e.g., a hardened touch screen mounted, perhaps flush, in or on a wall or other permanent structure) and disposing other components of the user terminal in an area protected from users (e.g., a distributed configuration). According to embodiments of the invention, a kiosk user terminal or portions thereof configured for deployment in a restricted area include features for preventing or minimizing injuries to persons. For example, corners and edges are preferably rounded or tapered. According to one embodiment, a hardened touch screen mounted on a wall comprises a bezel having ramped (e.g., trapezoidal) sides, such that the transition from the plane of the wall surface to the plane of the touch screen surface is presented in a gradual slope rather than at a right angle. Another embodiment provides a hardened touch screen is disposed in a "bubble" bezel, such that a hemisphere has a flat surface centered on a face thereof to present the touch screen surrounded by a circular, smoothly curved bezel. Such a bubble bezel configuration provides additional space within the confines of the structure to facilitate housing and convenient replacement of modular components of the kiosk user terminal.

The foregoing user terminal configurations may be utilized to provide a user terminal conveniently disposed to allow residents of the controlled environment facility to retrieve information (e.g., account balance, order status, time remaining for incarceration, number of days of good behavior, when particular services will be provided or are available, instructions for obtaining services, controlled environment facilities rules and procedures, reference materials such as dictionaries and encyclopedias, news publications or broadcasts, job listings, etcetera) and obtain services (e.g., order commissary items, receive and/or place phone calls, send and/or receive electronic mail, schedule infirmary visits, order pharmaceuticals, job training, job placement assistance, schedule visits by friends or family, etcetera).

A kiosk user terminal deployed in an area exposed to some residents of a controlled environment facility but which is provided a relatively high level of supervision, such as within a booking or holding area of a prison, may be hardened against a relatively high potential for abuse. Such hardening may comprise providing a shock and tamper resistant housing, providing secure attachment points for affixing to a wall or other permanent structure, disposing all wiring internal to the terminal and having all external wiring enter via points protected by the terminal's attachment to the wall or other permanent structure, providing user input through a touch screen having a thick or otherwise shock resistant touch mask, disposing speakers and/or microphones behind perforated surfaces of the housing, and/or the like. However, such a user terminal may comprise external components, less suitable for application of hardening techniques, to facilitate desired functionality. For example, a kiosk user terminal deployed in a booking or holding area may comprise a barcode, magnetic strip reader, and/or MICR reader, a slot for accepting currency, a slot for outputting a receipt or other printed matter, and/or the like accessible to users thereof. Accordingly, the foregoing user terminal configuration may be utilized to provide a user terminal conveniently disposed to allow new residents of the controlled environment facility to retrieve information (e.g., when particular services will be provided or are available, controlled environment facilities rules and procedures, listings for service providers such as bail bondsmen and lawyers, etcetera) and obtain services (e.g., engage and even pay a service provider such as a bail bondsman or lawyer, establish a prepaid account for services such as calling and/or commissary, receive and/or place phone calls, send and/or receive electronic mail, schedule meetings and/or visits, etcetera).

A kiosk user terminal deployed in an area exposed to the general public, particularly those which are provided a relatively high level of supervision, such as within a lobby area of a prison or within a business, may be hardened against a lesser potential for abuse. Such hardening may comprise providing a shock and tamper resistant housing, providing secure attachment points for affixing to a wall or other permanent structure, disposing wiring to enter via points protected by the terminal's attachment to the wall or other permanent structure, providing user input through a touch screen having a thick or otherwise shock resistant touch mask, and/or the like. However, such a user terminal may comprise external components, less suitable for application of hardening techniques, to facilitate desired functionality. For example, in addition to the above mentioned external components, a kiosk user terminal deployed for public use may comprise various input devices such as a pointing device (e.g., mouse, a track ball, a touch pad, and/or a joystick), a keyboard, a telephone handset such as to facilitate telecommunications and helpdesk calls, and/or the like accessible to users thereof. Accordingly, the foregoing user terminal configuration may be utilized to provide a user terminal conveniently disposed to allow friends and family of residents of the controlled environment facility to retrieve information (e.g., the status of a resident, schedule information associated with a resident, the facility, and/or personnel thereof, when particular services will be provided or are available, controlled environment facilities rules and procedures, listings for service providers such as bail bondsmen and lawyers, account balances and status information, etcetera) and obtain services (e.g., engage and even pay a service provider such as a bail bondsman or lawyer, pay a bail amount, establish a prepaid account for services such as calling and/or commissary, receive and/or place phone calls, send and/or receive electronic mail, schedule meetings and/or visits, etcetera).

Although the foregoing exemplary user terminal configurations have been described with reference to use by residents of a controlled environment facility and friends and family thereof, it should be appreciated that user terminals of the present invention may be utilized by any number of different user types. For example, a user terminal kiosk configuration may be utilized by controlled environment facility personnel, such as to input and retrieve information (e.g., information regarding the controlled environment facility and residents thereof, information regarding personnel and other resources, information regarding themselves, etcetera) and/or to obtain or perform services (e.g., to query data for investigating a resident, to conduct a background check on a visitor, to schedule meetings and/or visits, etcetera).

Figure 2:
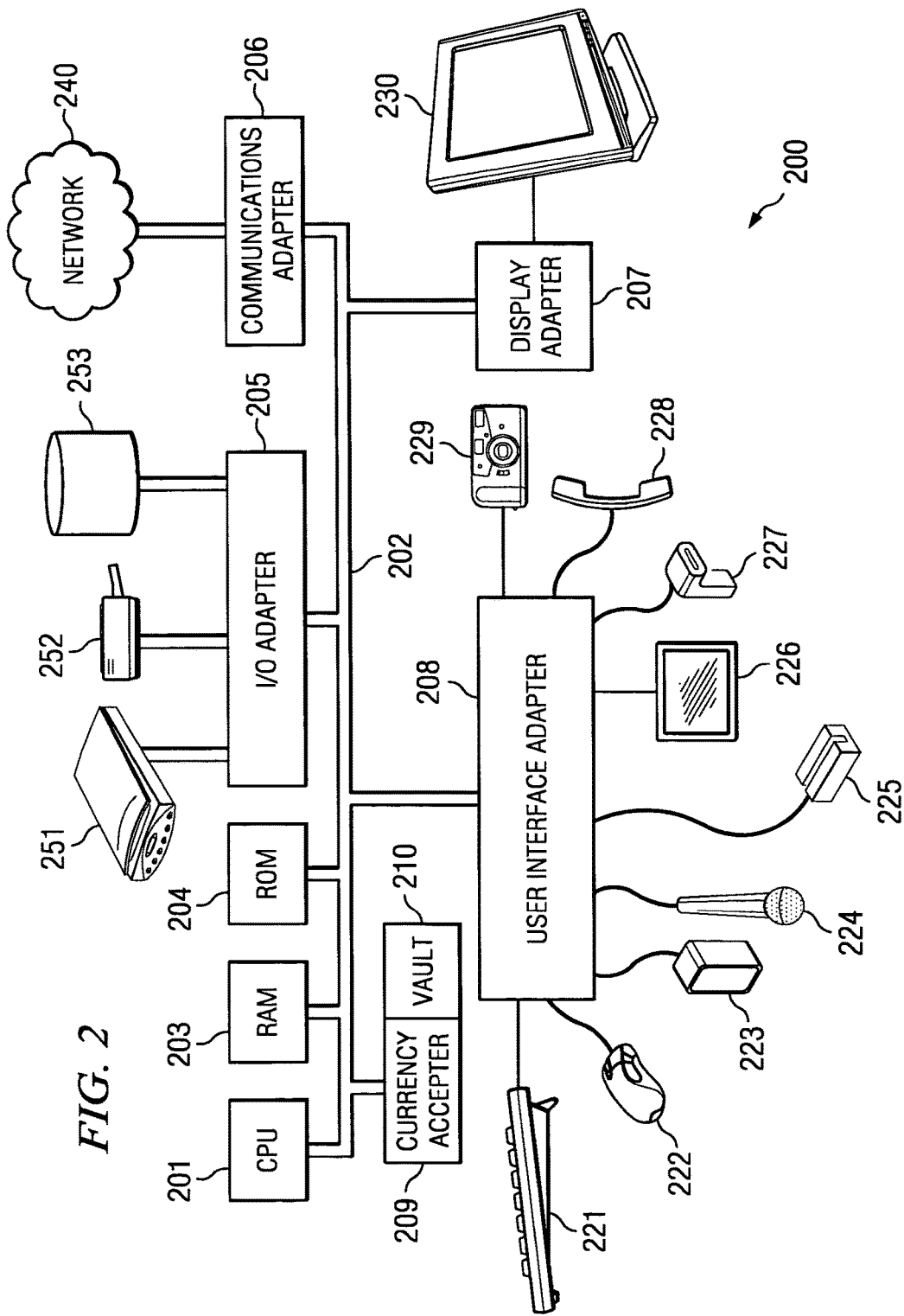
FIG. 2 shows a processor-based user terminal adapted according to an embodiment of the present invention.

Directing attention to FIG. 2, processor-based user terminal 200, such as may correspond to an embodiment of any of user terminals 121-1, 121-2, 122-1, 122-2, 131-1, and 132-2, configured for self-service operation as described herein is shown. Although any of user terminals 121-1, 121-2, 122-1, 122-2, 131-1, and 132-2 may comprise the embodiment of processor-based user terminal 200 illustrated in FIG. 2, various ones of the user terminals may implement different ones of the illustrated components. For example, as discussed above, a user terminal adapted for use in particular situations and/or for particular users may include a subset of the illustrated user input devices. Moreover, although various user terminal configurations, such as computers 121-1, 122-1, and 131-1 and kiosks 121-2, 122-2, and 131-2, may comprise a processor-based user terminal 200 illustrated in FIG. 2, such user terminal configurations may include differences not shown in FIG. 2. For example, a kiosk embodiment, although implementing many or all of the components shown in FIG. 2, may be fully incarcerated within a shock and tamper resistant housing, whereas a computer embodiment implementing the same components may be provided in a modular open system arrangement.

In the illustrated embodiment of processor-based user terminal 200, central processing unit (CPU) 201 is coupled to system bus 202. CPU 201 may be any general purpose CPU, such as a processor from the Intel PENTIUM processor family, or Motorola POWERPC processor family. However, the present invention is not restricted by the architecture of CPU 201 as long as CPU 201 supports the inventive operations as described herein. Processor-based user terminal 200 may be operating under control of an operating system such as Microsoft WINDOWS NT, or other release of the WINDOWS operating system, UNIX, LINUX, and the like.

In order to provide secure operation, preferred embodiments of processor-based user terminal 200 protect access to the operating system such that users are only provided access to particular application programs, or portions thereof. Additionally or alternatively, embodiments of the invention may provide restrictions with respect to the particular applications that may be run, the particular data or data types that may be accessed, the particular systems or domains that may be accessed, etcetera. For example, particular IP addresses, phone numbers, e-mail addresses, etcetera may be accessed or blocked depending upon a particular location the user terminal is disposed in, a particular function being performed, a particular user accessing the terminal, etcetera. Biometrics (e.g., voice prints, fingerprints, etcetera), personal identification numbers, passwords, and/or the like may be used by processor-based user terminal 200 to uniquely identify users, to provide access to particular applications and information, or to otherwise provide security.

CPU 201 and/or communication adaptor 206 may implement cryptographic techniques to provide security for information processed by processor-based user terminal 200. For example, public key cryptography may be utilized to exchange information with various systems in communication with processor-based user terminal 200.

Bus 202 of processor-based user terminal 200 is coupled to random access memory (RAM) 203, which may be SRAM, DRAM, SDRAM, and/or the like. ROM 204 is also coupled to bus 202, which may be PROM, EPROM, EEPROM, and/or the like. RAM 203 and ROM 204 hold user and system data and programs as is well known in the art.

Bus 202 is also coupled to input/output (I/O) controller 205, communications adapter 206, user interface adapter 208, and display adapter 207. I/O adapter 205 connects to storage devices 253, such as one or more of a hard drive, a CD drive, a floppy disk drive, a tape drive, to the systems of processor-based user terminal 200. I/O adapter 253 is also connected to printer 252, which allows the system to print paper copies of information such as receipts, documents, photographs, articles, etcetera. Note that the printer may a printer (e.g. dot matrix, laser, etcetera), a facsimile machine, a copy machine, and/or the like. I/O adapter 253 if the illustrated embodiment is also connected to scanner 251, which allows the system to acquire images of documents, photographs, graphics, fingerprints, etcetera. Display adapter 207 is driven by CPU 201 to control the display on display device 230.

Communications adapter 206 is adapted to couple processor-based user terminal 200 to other systems, such as via network 240 or other links. Network 240 may comprise one or more of a telephone network, a LAN, a MAN, a WAN, the Internet, and/or the like. Other links utilized by processor-based user terminal 200 may include wireline, wireless, fiber optic, and optical.

User interface adaptor 208 couples user input and output devices to processor-based user terminal 200. The illustrated embodiment of processor-based user terminal 200 is coupled to, keyboard 221, pointing device 222, speaker 223, microphone 224, magnetic strip and/or MICR reader 225, touch screen 226, barcode scanner 227, telephone handset 228, and camera 229.

Bus 202 of the illustrated embodiment is coupled to currency acceptor 209. Currency acceptor 209 preferably comprises a bill validator such that money may be inserted by a user for validation and valuation by currency acceptor 209 and then passed for secure storage within vault 210. Currency accepter 209 may pass information such as an amount of money collected to components of processor-based user terminal 200, such as CPU 201.

Having described systems adapted according to embodiments of the present invention above, descriptions of operation of such systems according to exemplary situations will be provided below to aid in understanding the concepts of the present invention. However, it should be appreciated that systems and methods of the present invention may be implemented with respect to situations in addition to or in the alternative to the particular examples discussed herein. Although particular functions may be described herein as being performed by a processor-based user terminal or a host information management system in communication therewith, embodiments of the present invention may provide processing of such functionality in systems other than as described. For example, a client/server configuration may be utilized wherein a substantial amount of processing is provided by a user terminal of the present invention. Additionally or alternatively, a browser type configuration may be utilized wherein a thin client provides little processing with respect to a user terminal. Likewise, various applications may operate in a terminal mode wherein all or substantially all processing takes place remotely with respect to the user terminal, such that primarily screen images or other input/output functions are the responsibility of the user terminal.

Figure 3:
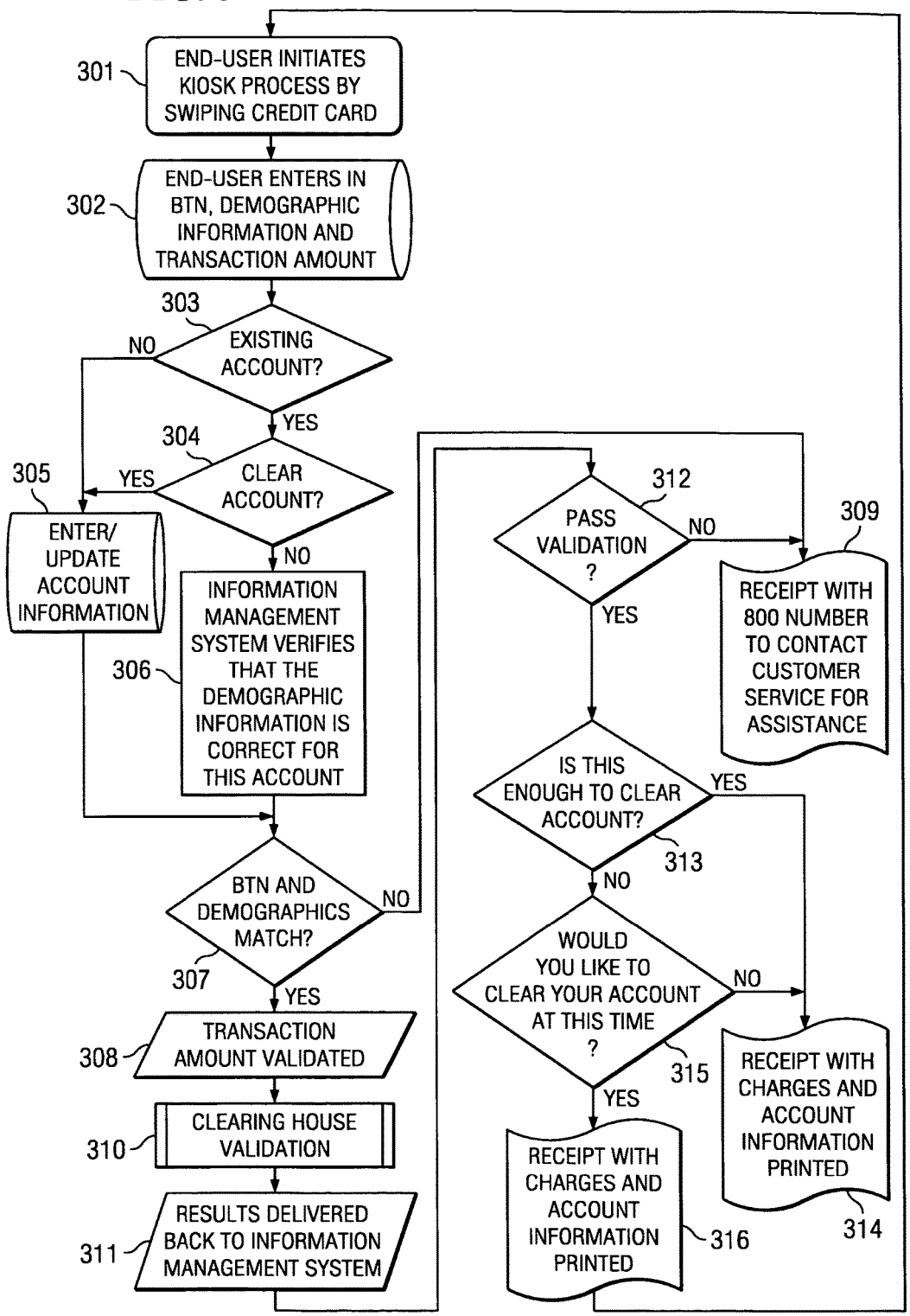
FIG. 3 shows a flow diagram of operation of a processor-based user terminal configured to provide self service with respect to creating and updating prepaid accounts.
Figure 4B:
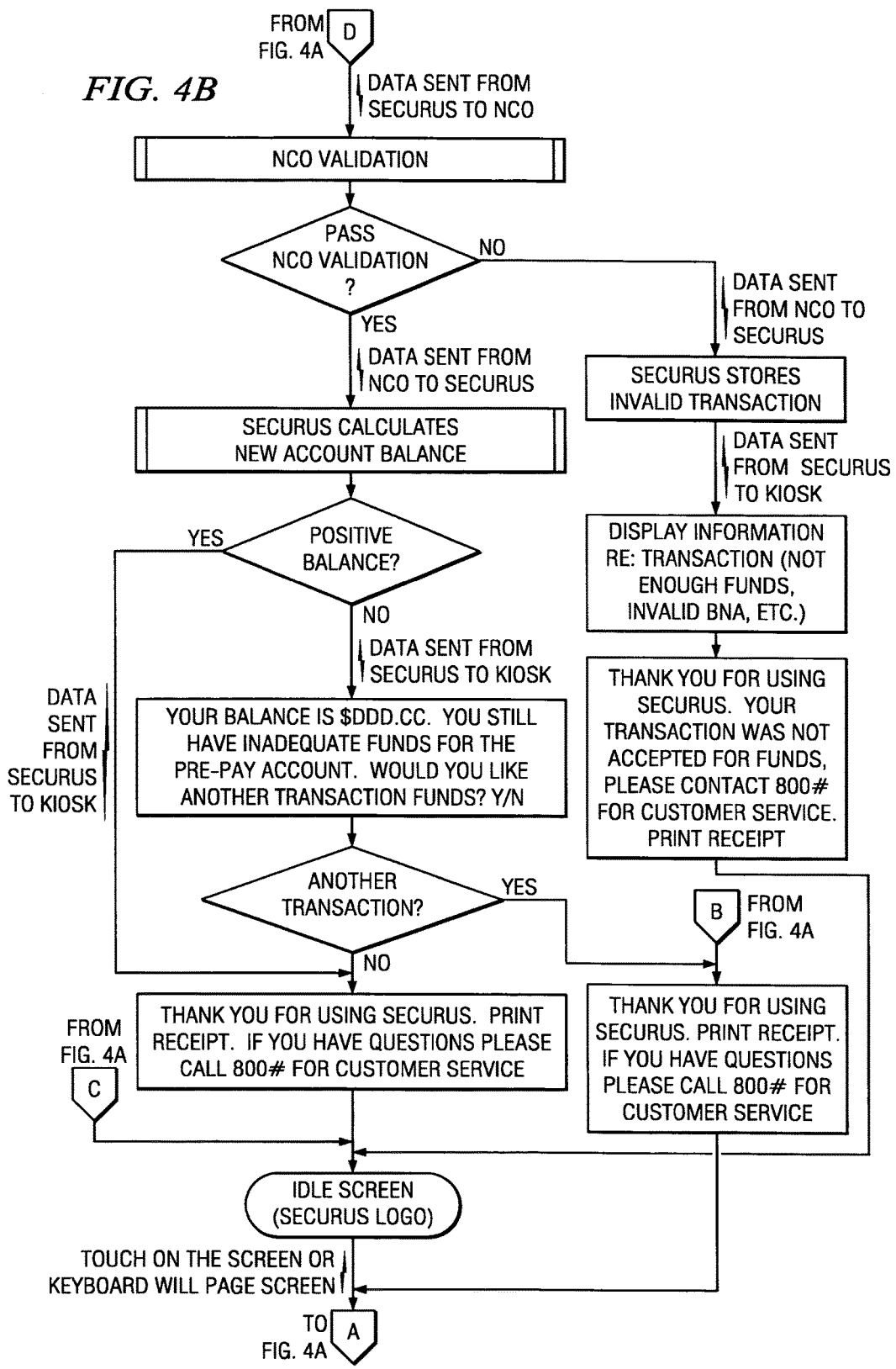

Directing attention to FIG. 3, a flow diagram of operation of a processor-based user terminal configured to provide self-service with respect to creating and updating prepaid accounts is shown. Detail with respect to a screen paging flow as may be presented by a processor-based user terminal operating according to the flow diagram of FIG. 3 is shown in FIGS. 4A and 4B.

Operation of the flow diagram of FIG. 3 may be utilized with respect to a kiosk user terminal disposed in a lobby area of controlled environment facility 100. Accordingly, a friend or family member of a resident of controlled environment facility 100 may fund a prepaid account on behalf of the resident, allowing the resident to pay for goods and services such as commissary items, telephone calls, professional services, etcetera.

A user may initially approach a kiosk user terminal and select (such as by touching a screen, a keyboard, or pointing device) prepaid account management from a menu of information and services available using the terminal. Thereafter, the user may be presented with options to receive information regarding prepaid account management or the services associated therewith. For example, a user may have an option to review answers to frequency asked questions, to review and/or receive a copy of a service guide, such as by mail or e-mail, etcetera. Where the prepaid account being created or updated is associated with telephone services, such information may outline what is allowed during telephone calls, calling features which are permitted to be used, times of day calls are permitted, and charges for particular calling services.

Assuming that a user elects to proceed with creation or management of a prepaid account, the user provides payment information to the kiosk user terminal of the illustrated embodiment at block 301. For example, a user may be asked to "swipe" a credit card or a check so that information in a magnetic strip or MICR code thereon can be read. Alternatively, a user may provide payment information by manual input of a credit card or bank account number. A user may provide payment in cash, such as using currency acceptor 209 discussed above.

The user is asked at block 302 of the illustrated embodiment to provide information regarding the account, such as a billed telephone number (e.g., a number to which or from which prepaid telephone calls are to be placed), demographic information (e.g., name, personal identification number, password, etcetera) for an individual associated with the account (e.g., the friend or family member funding the account and/or the resident of the controlled environment facility to benefit from the account), an account number for an account to be managed, and/or the transaction amount (e.g., an amount to be deducted from the funds identified in the payment information and deposited into the prepaid account being created or updated).

At block 303 of the illustrated embodiment, a determination is made as to whether an existing account is being updated or a new account is being created. For example, the kiosk user terminal may communicate with information management system 110 to determine if the information provided by the user corresponds to an existing account. Additionally or alternatively, information management system 110 may determine if the user is associated with a particular existing account. If it is determined that the user is creating a new account, processing proceeds to block 305 wherein an account is initialized using the provided information. However, if it is determined that the user is updating an existing account, processing proceeds to block 304.

At block 304 a determination is made as to whether the account being updated is clear (e.g., no blocks have been placed on the account, such as for misuse or for administrative purposes). If it is determined that the account being updated is not clear, processing proceeds to block 305 wherein interaction with the user is implemented in an effort to reinitialize the account and clear the account (e.g., the user may be placed in communication with a customer service representative, such as using a telephone handset of the user terminal, to explain the reason for the account block and to take the appropriate action to remove the block). However, if it is determined that the account being updated is clear, processing proceeds to block 306.

At block 306 of the illustrated embodiment information management system 110 matches information provided by the user with information associated with the existing account to identify discrepancies. Thereafter, processing proceeds to block 307 according to the illustrated embodiment. Similarly, after initializing or reinitializing an account at block 305, processing proceeds to block 307 according to the illustrated embodiment.

At block 307 a determination is made as to whether information provided by the user sufficiently matches information associated with the account selected for management. For example, a valid account number may have been provided by the user and thus that account may have been selected for management, although demographic information associated with that account may not substantially correspond to that provided by the user. Such a situation may suggest an error by the user or a need to update/change demographic information associated with the account. Accordingly, if it is determined that information provided by the user does not sufficiently match information associated with the account selected for management, processing according to the illustrated embodiment proceeds to block 309 wherein a receipt is printed providing contact information for a customer service representative to assist in completing the transaction. Alternatively, the user may be placed in communication with a customer service agent in real-time, such as using handset 228 described above. However, if it is determined that information provided by the user sufficiently matches information associated with the account selected for management, processing proceeds to block 308.

At block 308, information management system 110 implements one or more transaction validation functions. For example, drawing funds against a credit card or checking account electronic funds transfer may include communication with a banking facility or other clearing house to compete the transaction. Information management system 110 provides information to the appropriate resource to validate the transaction.

At block 310 an appropriate facility, such as a banking facility or other clearing house, processes the transaction. Such processing may facilitate the transfer of funds from a payment account of the user to a deposit account of an entity associated with operation of information management system 110 and/or controlled environment facility 100. Where the facility can validate the transaction (e.g., the facility is able to transfer funds), an affirmative validation response may be generated. However, where the facility cannot validate the transaction (e.g., the facility is unable to transfer funds), a negative validation response may be generated.

At block 311 information management system 110 receives validation results from the validation facility. For example, information management system 110 may receive an affirmative validation response or a negative validation response.

At block 312 a determination is made as to whether the transaction passed validation. If it is determined that the transaction did not pass validation, processing proceeds to block 309 wherein a receipt is printed providing contact information for a customer service representative to assist in completing the transaction. Alternatively, the user may be placed in communication with a customer service agent in real-time, such as using handset 228 described above. However, if it is determined that the transaction did pass validation, processing proceeds to block 313.

At block 313 a determination is made as to whether the transaction has provided funds sufficient to clear the selected account. For example, the account may have a negative balance associated therewith for which the deposit being made is insufficient to overcome. Additionally or alternatively, a minimum positive balance may be implemented such that account balances below the minimum are not allowed to fund all or particular transactions. If it is determined that the transaction has not provided funds sufficient to clear the selected account, processing according to the illustrated embodiment proceeds to block 315 wherein the user is queried as to whether the user would like to clear the account. If the user would like to clear the account processing proceeds to block 316 wherein a receipt for the transaction is printed and processing proceeds to block 301 to implement another transaction, perhaps using a different source of funds. If, however, it is determined that the transaction has provided funds sufficient to clear the selected account, processing according to the illustrated embodiment proceeds to block 314. Likewise, if the user would not like to clear the account at block 315, processing proceeds to block 314.

At block 314 a receipt for the transaction is printed and provided to the user. Thereafter, the kiosk terminal may again present a menu of information and services available using the terminal for selection by a user.

Figure 5:
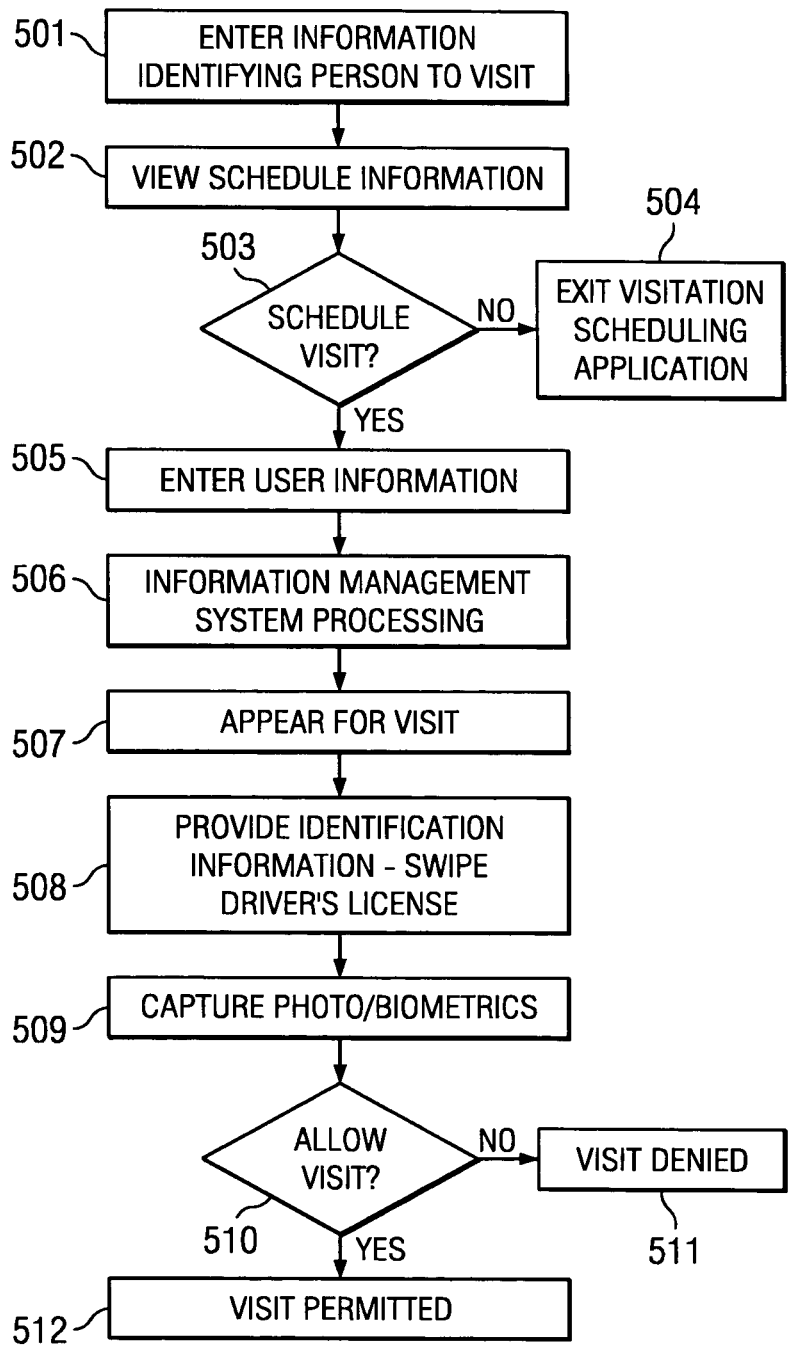
FIG. 5 shows a flow diagram of operation of a processor-based user terminal configured to provide self service with respect to visitation.

Directing attention to FIG. 5, a flow diagram of operation of a processor-based user terminal configured to provide self service with respect to visitation is shown. For example, operation of the flow diagram of FIG. 5 may be utilized with respect to a kiosk user terminal disposed in a lobby area of controlled environment facility 100. Additionally or alternatively, portions of the flow diagram of FIG. 5 may be accomplished using a processor-based user terminal disposed external to controlled environment facility 100, such as an Internet terminal or kiosk disposed at a business location. Operation of the flow diagram of FIG. 5 facilitates a friend or family member of a resident of controlled environment facility 100 scheduling visitation with the resident.

A user may initially approach a kiosk or other user terminal and select (such as by touching a screen, a keyboard, or pointing device) visitation scheduling from a menu of information and services available using the terminal. For example, the user may be exiting the controlled environment facility from a visit and wish to schedule a subsequent visit or the user may be at home or work and wish to schedule visit. After selecting visitation scheduling, the user may be presented with options to receive information regarding visitation scheduling or visitation in general. For example, a user may have an option to review answers to frequency asked questions, to review and/or receive a copy of visitation policies and procedures, etcetera. Such information may outline what is allowed during visitation, a dress code for visitation, and forms of identification required to be permitted visitation.

At block 501 the user enters information identifying the resident of the controlled environment facility the user wishes to visit. For example, the resident's name, personal identification number, and/or other information may be entered to identify the resident. Such information may uniquely identify the resident. However, the user may not have sufficient information to uniquely identify the resident. Where the resident to be visited is not uniquely identified, embodiments of the invention may present a list of candidate residents for selection. Additionally or alternatively, the user may be placed in communication with a customer service representative, such as using handset 228 and/or instant messaging technologies, to provide assistance in uniquely identifying the resident to be visited.

At block 502 the processor-based user terminal presents schedule information useful in scheduling visitation with the resident. For example, the scheduling information may provide scheduling opportunities during dates and times the controlled environment facility allows visitation. Additionally or alternatively, the scheduling information may provide dates and times the resident to be visited is available or not available for visitation. For example, the resident may not be eligible for visitation for several weeks due to punishment or other reasons, and thus the scheduling information would show the resident as unavailable for the appropriate weeks. Similarly, the resident may have an appointment in the infirmary, and thus the scheduling information would show the resident as unavailable at the appropriate time. It should be appreciated that, although scheduling information may be provided showing availability or unavailability for visitation, such information may be presented without details, such as the reason the resident is unavailable.

At block 503 a determination is made as to whether the user wishes to schedule a visit. For example, the dates and times the resident is available for visitation may not correspond to dates and times the user is available for visitation. If it is determined at block 503 that the user does not wish to schedule visitation, processing proceeds to block 504 wherein a visitation scheduling application is exited, perhaps returning to the aforementioned menu. However, if it is determined that the user does wish to schedule visitation, processing proceeds to block 505.

At block 505 of the illustrated embodiment the user inputs information utilized by the controlled environment facility in making determinations with respect to permitting or denying visits. For example, the user may be required to provide a verifiable form of identification, such as a valid driver's license or passport. Additionally or alternatively, the user information may include contact information, such as telephone number and/or electronic mail address, to facilitate contacting the user should the scheduled visit need to be changed or canceled for any reason. It should be appreciated that the user may be identified to the system prior to entry of user information at block 505. For example, a user may have input a user name and password to have accessed the visitation scheduling application. The user information entered at block 505 may be information used to supplement and/or verify previously input user information.

After completion of block 505, the user has completed scheduling a visit with a particular resident. The visit may be days, weeks, or months in the future. Accordingly, the user may exit operation of the visitation application, at least temporarily, after completion of block 505.

At block 506 information management system 110 of the illustrated embodiment performs processing to facilitate the scheduled visit. For example, information management system 110 may operate to query various resources, such as database 151-1 and/or server 151-Q, perhaps under control of controlled environment facility personnel, in order to conduct a background check of the user who scheduled the visit. Additionally or alternatively, information management system 110 may provide notification (e.g., by placing an automated telephone call, transmitting an electronic mail message, transmitting an instant message, transmitting a short message service message, etcetera) to the user who scheduled the visit if the visitation time needs to be changed or the visit has been canceled, such as due to a "lock-down" at the controlled environment facility, the resident's schedule changing, etcetera.

At block 507 the user who scheduled the visit appears at the controlled environment facility for the scheduled visit. If the user is utilizing the processor-based user terminal to schedule an immediate visit, processing may have continued uninterrupted from blocks 505 and 506 to block 507. However, where the user scheduled the visit in advance, substantial time may have elapsed between the processing of blocks 505 and/or 506. Accordingly, the user may approach a kiosk disposed in a lobby of the controlled environment facility on the day of the scheduled visit and select (such as by touching a screen, a keyboard, or pointing device) visitation from a menu of information and services available using the terminal to check in for the visit.

At block 508 the user provides identification information, such as by "swiping" a driver's license for reading information from a magnetic strip or barcode thereon using magnetic strip reader 225 and/or barcode reader 227. This information may be used to verify that the user is the same individual who scheduled the visit. The illustrated embodiment supplements this identification information with other information, such as by taking a photograph of the user using camera 229 and/or capturing biometric information using scanner 251 and/or microphone 224, at block 509. This information may be compared to previously input information, information acquired from a trusted source, and/or to the person present for the visit, such as by information management system 110 and/or controlled environment facility personnel.

At block 510 a determination is made as to whether the visit is to be allowed or denied. For example, the identification information may not correspond to the information provided by the user who scheduled the visit, and thus the background check may be rendered unreliable, suggesting that the visit should be denied. Similarly, although the identification information may correspond to the information provided by the user who scheduled the visit, the photo of the user captured by the processor may not correspond to the identified individual, again suggesting that the visit should be denied. The aforementioned background check may have revealed that the user who scheduled the visit has an outstanding warrant or is otherwise ineligible for a visit. Although processing by information management system 110 may notify the user that such a background check revealed the user is ineligible for a visit, embodiments of the invention do not operate to provide such notification in situations such as the case of an outstanding warrant in order to facilitate the user coming to the controlled environment facility where the appropriate authorities may approach the user.

If at block 510 it is determined that the visit should be denied, processing according to the illustrated embodiment proceeds to block 511 where visitation is denied. However, if it is determined that the visit should be permitted, processing according to the illustrated embodiment proceeds to block 512 where visitation is permitted.

Although the above example has been described with reference to a user scheduling a visit with a resident of the controlled environment facility, operation of embodiments of the present invention may provide additional or alternative scheduling applications. For example, a resident of the controlled environment facility may utilize a processor-based user terminal to conduct a self-serve session for scheduling resources such as an infirmary appointment.

It should be appreciated that embodiments of the invention operate to provide processor-based self-service user terminals for use with respect to a plurality of functions and a plurality of users. Accordingly, a variety of information associated with a controlled environment facility is processed by the systems of embodiments of the present invention. Embodiments operate to aggregate, compile, correlate, and link information to provide data heretofore unavailable from separate or manual systems used with respect to controlled environment facilities. For example, controlled environment facility personnel may utilize embodiments of the present invention to conduct investigations, such as to link various individuals through their calls, purchases, deposits, visits, etcetera. Similarly, vertical and horizontal integration may be provided with respect to the information collected or otherwise available through the systems of the present invention.

Embodiments of the present invention may be utilized to provide information management and facilitate services with respect to a variety of users and/or in a variety of situations. For example, a processor-based self-service user terminal disposed in a pod or cell of an inmate facility may be used by inmates for scheduling (e.g., visitation, commissary delivery, medical appointments, court appointments, attorney visitation requests, education, exercise, work, parole/probation hearings, release, etcetera), communication (e.g., place/receive calls, send/receive electronic mail communications, maintain contact lists, records of calls made, prepaid account balance, etcetera), commissary (e.g., view account balance, order items, request items not in inventory, check order status, etcetera), education (e.g., obtain high school GED, learn new skills (e-class), request literature (library services), e-books, etcetera), work (e.g., work release program, job assistance, etcetera), general information and self improvement (e.g., news and current events, restricted Internet access, restricted electronic mail, bible study, self-help such as anger management, Alcoholics Anonymous, and addiction assistance, etcetera), and/or the like. Detainees being processed into an inmate facility may benefit from a processor-based self-service user terminal disposed in a holding or booking area of an inmate facility for data input/output (e.g., entering demographic information, biometric data for unique identification, obtaining a personal identification number, receiving information on policies and procedures, providing contact information for persons potentially able to provide bail, obtaining information regarding service providers such as bail bondsmen and attorneys, etcetera), scheduling (e.g., visitation, medical appointments, court appointments, attorney visitation requests, hearings, release, etcetera), communication (e.g., place/receive calls, send/receive electronic mail communications, maintain contact lists, records of calls made, prepaid account balance, etcetera), property management (e.g., check in personal effects for storage), and/or the like. Friends and family of detainees and inmates of an inmate facility may benefit from a processor-based self-service user terminal disposed in a lobby or other public area of an inmate facility for data input/output (e.g., entering demographic information, biometric data for unique identification, receiving information on policies and procedures, providing contact information, obtaining information regarding service providers such as bail bondsmen and attorneys, etcetera), scheduling (e.g., visitation, meetings with inmate facility personnel, court appearances, etcetera), communication (e.g., place/receive calls, send/receive electronic mail communications, maintain contact lists, records of calls made, prepaid account balance, etcetera), and/or the like.

Inmate facility personnel, such as guards, may benefit from the use of processor-based self-service user terminals of the present invention through supervision and identification (e.g., video monitoring/surveillance, barcode or other unique identifier tracking, demographics data collected regarding inmates, health issues identified regarding inmates, problem histories, criminal background information, etcetera), reports (e.g., inmate schedules, statistical and trend analysis, etcetera), communication monitoring (e.g., inmate contact lists, call/electronic mail records, call recordings, live call monitoring, etcetera), and/or the like. Booking, bonding, and release personnel and property personnel bay benefit from the use of processor-based self-service user terminals of the present invention through property management (e.g., inventory checked in and returned upon release, inventory checked out while in the inmate facility, assist in stocking inventory, transfer of inmate property between facilities, etcetera), automated input and/or verification of information (e.g., linking of information from courts and police, inmates providing input of data, such as demographic data and biometric data at user terminals, etcetera), and/or the like. Administrators of the inmate facility may benefit from the use of processor-based self-service user terminals of the present invention through reports (e.g., visitation background checks, identification of individuals visiting inmates, commissary usage, medical appointments, court appointments, attorney visitation requests, education, exercise, work programs, parole/probation hearings, release dates for inmates, inmate transfers, etcetera), communication monitoring (e.g., inmate contact lists, call/electronic mail records, call recordings, live call monitoring, etcetera), commissary monitoring (e.g., view account balances of inmates, managerial reports, financial reporting, reporting on items ordered/requested, etcetera), education monitoring (e.g., inmates receiving continuing education, reports on education success rates, etcetera), media and faith monitoring (e.g., analysis of what inmates are doing in their free time, etcetera), job assistance (e.g., work release program, job placement program, etcetera), facility management (e.g., scheduling guards and administrative staff, managing events such as visitation, inmate transfers, and inmate releases, facility costs and revenue, expansion needs, facility demographic reporting, incident reporting, etcetera), and/or the like. Medical personnel may benefit from the use of processor-based self-service user terminals of the present invention through security (e.g., demographic information regarding inmates, health issues identified regarding inmates, problem histories, criminal background information, etcetera), reports (e.g., inmate schedules regarding infirmary and hospital visits, medical records, etcetera), healthcare data (e.g., treatments and procedures performed on inmates, diagnoses for inmates, medical history of inmates, medical appointments, medical transfer documents, psychiatric treatment and evaluations, medication prescription information for inmates, etcetera), and/or the like. Clergy and educational personnel may benefit from the use of processor-based self-service user terminals of the present invention through inmate assistance request fulfillment (e.g., counseling and guidance, self-help assistance, etcetera), library services (e.g., satisfying book requests, checking out loan materials, keeping material inventories, providing e-books, etcetera), classroom services (e.g., providing GED learning, continuing education, skills and trades training, etcetera), and/or the like. Employment personnel may benefit from the use of processor-based self-service user terminals of the present invention through administering facility work programs (e.g., internal job records, payroll management such as direct deposit into commissary accounts, etcetera), work release programs (e.g., job records, eligibility management, scheduling inmates both inside and outside of the inmate facility, etcetera), employment after release programs (e.g., job assist program, records transfer to/from parole/probation officer, etcetera), and/or the like. Court system and district attorney personnel may benefit from the use of processor-based self-service user terminals of the present invention through inmate facility records information (e.g., phone call records, electronic mail records, recorded phone conversations, visitation records, photographs of visitors, background checks of visitors, court appointments, information regarding inmate facility stay such as education, work, and rehabilitation, video surveillance, etcetera), scheduling (e.g., hearings, interviews, court appointments, attorney visitation, parole/probation hearings, release, etcetera), communication (e.g., communicating with friends and family of inmates, communicating with inmate facility personnel, etcetera), and/or the like. Release, probation, and parole personnel may benefit from the use of processor-based self-service user terminals of the present invention through employment management (e.g., job assist programs, employment records, etcetera), inmate facility record information (e.g., information regarding inmate facility stay such as education, and work, rehabilitation, etcetera), and/or the like. Government personnel, such as federal, state, county, and municipal, may benefit from the use of processor-based self-service user terminals of the present invention through providing information useful for homeland security (e.g., metrics, statistics, video files, audio files, inmate contacts, background on inmates and inmate contacts, inmate facility population records, parole/probation records, watch lists, tracking criminals for specific criminal backgrounds such as sex offenders, crime profiles, etcetera, interface with Interpol, etcetera), providing information useful for law enforcement (e.g., metrics, statistics, video files, audio files, inmate contacts, background on inmates and inmate contacts, tracking criminals for specific criminal backgrounds, etcetera), providing information useful for other government agencies (e.g., employment statistics, recidivism statistics, tracking criminals for specific criminal backgrounds, etcetera), and/or the like. It should be appreciated that benefits may be provided to the foregoing personnel, administrators, government officials, etcetera without their direct use of a processor-based self-service user terminal of the present invention. For example, configuring and deploying such processor-based self-service user terminals for use by inmates and friends and family provides access to data, as may be aggregated, compiled, and processed, heretofore unavailable for the foregoing uses.

Although the present invention and advantages thereof have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system, comprising:
    a processor-based self-service kiosk user terminal configured to communicate with an information management system to facilitate self-service acquisition of correctional facility information and services by a user thereof, the information management system configured to: (i) manage information relating to personnel, inmates, vendors, or resources, (ii) request or provide goods or services, (iii) determine credit worthiness, (iv) manipulate an account associated with an inmate, (v) compile information regarding calls, purchases, deposits, and visits, (vi) link various individuals through their calls, purchases, deposits, and visits based upon the compiled information, and (vii) provide the compiled information to an investigator;

the processor-based self-service kiosk user terminal further including a biometric sample input.

2. The system of claim 1, wherein said information comprises information selected from the group consisting of: availability of resources of the correctional facility, availability of services of the correctional facility, a status of the correctional facility, a status of a person associated with the correctional facility, a status of an account associated with the correctional facility, frequency asked questions regarding the correctional facility, procedures of the correctional facility, and policies of the correctional facility.

3. The system of claim 1, wherein the services comprise services selected from the group consisting of: management of an account associated with the correctional facility, a purchase transaction associated with the correctional facility, scheduling a visit with a person associated with the correctional facility, and scheduling an appointment with a resource of the correctional facility.

4. The system of claim 1, wherein the processor-based self-kiosk user terminal further comprises:
a hardened tamper resistant housing comprising a processor, a memory, an input/output including at least a display screen, and an application program configured to control operation of the kiosk user terminal to facilitate self-service acquisition of information and services by the user.

5. The system of claim 4, wherein the processor-based self-kiosk user terminal further comprises:
a telephone handset configured to facilitate real-time customer service representative assistance to the user.

6. The system of claim 4, wherein the processor-based self-kiosk user terminal further comprises:
a reader configured to read at least one of: a magnetic strip, magnetic ink character recognition code, or a barcode.

7. The system of claim 4, wherein the processor-based self-kiosk user terminal further comprises:
a camera for capturing an image of said user, said application program operable to associate said image with information input by said user.

8. The system of claim 1, wherein the processor-based self-kiosk user terminal is disposed in a restricted area of the correctional facility.

9. The system of claim 8, wherein the restricted area of the correctional facility comprises a cell area for incarceration of individuals.

10. The system of claim 1, wherein the processor-based self-kiosk user terminal is disposed in a holding area of the correctional facility, wherein said holding area is used for processing individuals before placing them into a restricted area of the correctional facility.

11. The system of claim 1, wherein the processor-based self-kiosk user terminal is disposed in a lobby area of the correctional facility, wherein the lobby area is accessible to individuals having business with the correctional facility.

12. The system of claim 1, wherein the processor-based self-kiosk user terminal is disposed external to the correctional facility and wherein the user is a non-resident of the correctional facility.

13. The system of claim 10, wherein the user is the inmate.

14. A method, comprising:
providing information management for a correctional facility via an information management system configured to: (i) manage information relating to personnel, inmates, vendors, or resources, (ii) request or provide goods or services, (iii) determine credit worthiness, and (iv) manipulate an account associated with an inmate;
configuring a processor-based self-service kiosk user terminal for use by a user, wherein the processor-based self-service kiosk user terminal comprises a biometric sample input;
coupling the self-service kiosk user terminal to a communication link for information communication with the information management system;
coupling the self-service kiosk user terminal to a gateway to a packet switched network, the gateway configured to provide conversion of telephone signals to provide voice over Internet protocol (VoIP) communications;
compiling information regarding calls, purchases, deposits, or visits via the self-service kiosk user terminal; and
providing the compiled information to an investigator.

15. The method of claim 14, wherein configuring the self-service kiosk user terminal comprises:
hardening the self-service kiosk user terminal for deployment in the correctional facility.

16. The method of claim 15, further comprising:
deploying the self-service kiosk user terminal in a restricted area of the correctional facility.

17. The method of claim 16, wherein the restricted area comprises a cell area of the correctional facility where inmates are incarcerated.

18. The method of claim 15, further comprising:
deploying the self-service kiosk user terminal in a holding or booking area of the correctional facility and wherein the user is the inmate.

19. The method of claim 18, wherein the holding area comprises an area of the correctional facility where persons are held awaiting processing into the correctional facility and wherein the user is the inmate.

20. The method of claim 15, further comprising:
deploying the self-service kiosk user terminal in a lobby area of the correctional facility and wherein the user is a non-resident of the correctional facility.

21. The method of claim 20, wherein the lobby area comprises an area of the correctional facility were persons having business with the correctional have access and wherein the user is a non-resident of the correctional facility.

22. The method of claim 14, wherein coupling the self-service kiosk user terminal to the communication link comprises:
coupling the self-service kiosk user terminal to a digital data network.

23. The method of claim 14, wherein using the self-service kiosk user terminal to provide self-service acquisition of correctional facility information comprises:
acquiring information selected from the group consisting of: availability of resources of the correctional facility, availability of services of the correctional facility, a status of the correctional facility, a status of a person associated with the correctional facility, a status of an account associated with the correctional facility, frequently asked questions regarding the correctional facility, procedures of the correctional facility, and policies of the correctional facility.

24. The method of claim 14, wherein using the self-service kiosk user terminal to provide self-service acquisition of correctional facility services comprises:
acquiring services selected from the group consisting of management of an account associated with the correctional facility, a purchase transaction associated with the correctional facility, scheduling a visit with a person associated with the correctional facility, and scheduling an appointment with a resource of the correctional facility.

25. A user terminal system for use in an inmate facility, said system comprising:

a hardened tamper resistant housing containing a processor, a memory, an input/output including at least a display screen, a biometric sample input, and an application program configured to control operation of said user terminal to facilitate self-service acquisition of inmate facility information and services by a plurality of users, wherein the inmate facility information and services are provided by an information management system configured to: (i) manage information relating to personnel, inmates, vendors, or resources, (ii) request or provide goods or services, (iii) determine credit worthiness, (iv) manipulate a pre-paid account associated with an inmate, (v) compile information regarding calls, purchases, deposits, or visits, and (vi) link various individuals through their calls, purchases, deposits, or visits based upon the compiled information.

26. The system of claim 25, wherein the user terminal further comprises:

a telephone handset configured to facilitate real-time customer service representative assistance to the users.

27. The system of claim 25, wherein the user terminal further comprises:

a reader configured to read at least one of: a magnetic strip, magnetic ink character recognition code, or a barcode.

28. The system of claim 25, wherein the user terminal further comprises:

a camera configured to capture an image of a user of the users, the application program operable to associate said image with information input by the user.

29. The system of claim 25, wherein the user terminal is disposed outside of the correctional facility and wherein the user is a non-resident of the correctional facility.

30. The system of claim 25, wherein the user terminal is disposed in a holding or booking area of the correctional facility and wherein the user is the inmate.

* * * * *